US010141597B2

(12) United States Patent
Moreau et al.

(10) Patent No.: US 10,141,597 B2
(45) Date of Patent: Nov. 27, 2018

(54) BIPOLAR LI-ION BATTERY HAVING IMPROVED SEALING AND ASSOCIATED METHOD OF PRODUCTION

(71) Applicant: COMMISSARIAT A L'ENERGIE ATOMIQUE ET AUX ENERGIES ALTERNATIVES, Paris (FR)

(72) Inventors: Gilles Moreau, Grenoble (FR); Michaël Bouvier, Varces Allieres et Risset (FR)

(73) Assignee: COMMIUSSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 333 days.

(21) Appl. No.: 14/892,780

(22) PCT Filed: Apr. 14, 2014

(86) PCT No.: PCT/IB2014/060698
§ 371 (c)(1),
(2) Date: Nov. 20, 2015

(87) PCT Pub. No.: WO2014/188288
PCT Pub. Date: Nov. 27, 2014

(65) Prior Publication Data
US 2016/0104913 A1    Apr. 14, 2016

(30) Foreign Application Priority Data
May 21, 2013 (FR) ...................................... 13 54543

(51) Int. Cl.
*H01M 6/46*    (2006.01)
*H01M 10/04*    (2006.01)
(Continued)

(52) U.S. Cl.
CPC ......... *H01M 10/0418* (2013.01); *H01M 2/08* (2013.01); *H01M 4/667* (2013.01);
(Continued)

(58) Field of Classification Search
CPC ........... H01M 10/0418; H01M 10/044; H01M 10/0472; H01M 10/0486; H01M 10/0525;
(Continued)

(56) References Cited

U.S. PATENT DOCUMENTS

2007/0207379 A1* 9/2007 Hatta ................... H01M 2/0207
                                                    429/176
2012/0171567 A1   7/2012 Obika et al.
2014/0045040 A1*  2/2014 Chami ................. H01M 2/1646
                                                    429/160

FOREIGN PATENT DOCUMENTS

EP    1418638    5/2004
JP    H0547360   2/1993

OTHER PUBLICATIONS

International Search Report for PCT/IB2014/060698 dated Jul. 25, 2014.

* cited by examiner

*Primary Examiner* — Raymond Alejandro
(74) *Attorney, Agent, or Firm* — Cooper Legal Group, LLC (57) ABSTRACT

A bipolar battery having at least two electrochemical cells stacked one on top of the other, the bipolar collector including, at the periphery of same, on one of the faces of same, at least one first sealing device including one frame made from an electrically insulating and thermosensitive material, and two adhesive frames arranged individually to either side of the thermosensitive frame, the first or the second adjacent collector also including, at the periphery of same, on the covered face of same, at least one second sealing device
(Continued)

including a frame made from an electrically insulating and thermosensitive material, and two adhesive frames arranged individually to either side of the thermosensitive frame, the first and second devices each forming a peripheral wall sealed to the electrolyte of the first or second cell, which surrounds same. Each sealed wall is obtained by heat-sealing at least one first and at least one second sealing device on the face of a current collector not provided with a sealing device.

8 Claims, 5 Drawing Sheets (51) Int. Cl.
*H01M 2/08* (2006.01)
*H01M 10/0525* (2010.01)
*H01M 10/0585* (2010.01)
*H01M 4/66* (2006.01)
*H01M 4/485* (2010.01)
*H01M 4/58* (2010.01)
*H01M 4/02* (2006.01)

(52) U.S. Cl.
CPC ..... *H01M 10/044* (2013.01); *H01M 10/0472* (2013.01); *H01M 10/0486* (2013.01); *H01M 10/0525* (2013.01); *H01M 10/0585* (2013.01); *H01M 4/485* (2013.01); *H01M 4/5825* (2013.01); *H01M 2004/029* (2013.01)

(58) Field of Classification Search
CPC .... H01M 10/0585; H01M 2/08; H01M 4/667; H01M 4/485; H01M 4/5825; H01M 2004/029
See application file for complete search history.

BIPOLAR LI-ION BATTERY HAVING IMPROVED SEALING AND ASSOCIATED METHOD OF PRODUCTION

FIELD OF TECHNOLOGY

The present invention relates to the field of lithium-based electrochemical generators, which operate according to the principle of insertion or of deinsertion, or in other words intercalation-deintercalation, of lithium in at least one electrode.

It relates more particularly to a lithium-based electrochemical accumulator comprising at least one current collector with bipolar function, also called a bipolar battery. In said bipolar battery, the bipolar collector, also called bipolar electrode, supports on each of its opposite faces, one of the two electrode materials with opposite sign, i.e. with a cathode (positive electrode) supported by one of the faces and an anode (negative electrode) supported by the other opposite face.

The invention aims to improve the sealing of electrochemical generators with respect to the electrolyte, and in particular to improve the sealing of a bipolar battery with respect to the electrolyte in liquid form.

PRIOR ART

The architecture of the conventional lithium-ion batteries is an architecture that may be described as monopolar, as it has a single electrochemical cell comprising an anode, a cathode and an electrolyte. Several types of geometry of monopolar architecture are known:
- cylindrical geometry as disclosed in patent application US 2006/0121348;
- prismatic geometry as disclosed in U.S. Pat. No. 7,348,098, U.S. Pat. No. 7,338,733;
- stack geometry as disclosed in patent applications US 2008/060189, US 2008/0057392, and U.S. Pat. No. 7,335,448.

A monopolar architecture is produced by winding. The winding consists of a current collector, on which a positive electrode material (cathode) is deposited continuously, a separator made of polymer or ceramic material being intercalated with a negative electrode material (anode), which is itself deposited on another current collector. The main advantage of this monopolar architecture is that it has a large active surface area of material, but the potential difference is restricted to the unit value of the potential difference between the two electrode materials used, which is also the case with stack geometry.

In order to increase the average potential of a monopolar Li-ion accumulator while maintaining a comparable energy density, it is known to make a battery with a plurality of electrochemical cells in series. The battery architecture is thus described as bipolar, as it comprises a cathode of one cell and an anode of an adjacent cell, which are supported on one and the same current collector in the form of a plate, itself described as a bipolar electrode. The architecture of a bipolar battery thus corresponds to setting up a series of several monopolar accumulators via bipolar electrodes or current collectors, but with the advantage of having reduced electrical resistance relative to monopolar accumulators connected in series by external connectors. Here we may mention numerous patents or patent applications concerning such bipolar batteries, such as U.S. Pat. No. 7,279,248, U.S. Pat. No. 7,220,516, U.S. Pat. No. 7,320,846, U.S. Pat. No. 7,163,765, WO 03/047021, WO 2006/061696, U.S. Pat. No. 7,097,937.

The subsequent advantages of a bipolar battery are that it has a reduced weight and does not comprise any dead space.

The main difficulty in designing a bipolar battery is making compartments that are perfectly impervious to the electrolyte, generally in liquid form, with respect to one another. In fact, poor sealing leads to malfunction of the bipolar battery by ionic short-circuits.

This is moreover corroborated by the fact that most of the patent literature concerning the field of bipolar Li-ion batteries relates to solutions for sealing, also called hermeticity, to prevent escapes of electrolyte from one compartment to another (ionic short-circuits). Whatever sealing system is adopted, it must:
- be chemically resistant to the liquid electrolyte, for example consisting of a solution of lithium salt $LiPF_6$ in an ethylene carbonate (EC), dimethyl carbonate (DMC) solvent mixture;
- be easy to use: in fact, during the operations of stacking of the different elements making up a bipolar battery, implementation of sealing must be able to be compatible with an industrial manufacturing line and to be carried out at relatively low temperatures, causing little or no degradation of the electrodes, of the separator or of the electrolyte;
- provide complete long-term sealing.

Among the patent applications or patents already cited above, we may mention U.S. Pat. No. 7,220,516, which describes a solution with a flexible adhesive film 5, 6, glued on the periphery of the bipolar collector.

We may also cite U.S. Pat. No. 7,320,846, which describes a solution for coating the collectors 4 and electrolytes 6 in a resin 10.

We may also cite U.S. Pat. No. 7,163,765, which describes a sealing solution with mixed polyamide/PP spacers 9 arranged between bipolar collectors, the polyamide being welded directly to the periphery of the collectors at a distance from the cells.

U.S. Pat. No. 7,097,937 proposes in its turn a double sealing solution, since an internal barrier 14, 22 made of fluoropolymer is arranged on the periphery of the bipolar collector 11 and an outer bead 18, 23 made of elastomer is arranged outside the barrier 14, 22 on and around the bipolar collector optionally with the arrangement of an additional ring 15 made of elastomer on the collector 11.

We may further cite patent application EP 2073300 in the applicant's name, which proposes a solution according to which the dimensions of the plates are increased, one plate relative to another adjacent plate, and the seals interposed between the interconnecting plates are displaced transversely so that two seals are not located directly opposite one another along the axis of the stack of cells.

We may finally cite application WO2011/157751, which describes a solution integrating polymer-based sealing means with a metal grid or sheet with the function of current collector.

Thus, the solutions already envisaged for improving the sealing of the compartments between one another with respect to the electrolyte in a bipolar Li-ion battery may be summarized as follows:
- systematic production of the bipolar current collector, also called bipolar electrode, in the form of a plate,
- use of glues/polymer or various resins at the periphery of the plate, enlarging the format of the bipolar current collector plate to create an additional barrier to the electrolyte, integration of the polymer-based sealing means with a metal grid or sheet with the function of current collector.

None of these sealing solutions already envisaged is completely satisfactory. In fact, they use polymers or resins that display robustness relative to the electrolyte that is low during operation of the bipolar battery and over time. Finally, heat-sealing of a polymer at the level of a compartment envisaged during manufacture of the bipolar battery may lead to deterioration of the sealing of the electrochemical compartments already sealed in fact because of the repeated heating, which may lead to untimely creep of the polymer of the latter.

Although the solution according to application WO 2011/157751 is perfectly satisfactory for sealing proper, as well as for the weight gain that it finally provides for the bipolar battery, it may limit electron conductivity between the two electrode materials (lithium-based insertion materials) on either side of a bipolar current collector and increase the internal electrical resistances in the latter.

The general aim of the invention is to propose a solution different than those already envisaged for improving the sealing of the compartments between them with respect to the electrolyte, in particular the liquid electrolyte, in a bipolar Li-ion battery, more generally in a lithium-based electrochemical generator.

A particular aim is to propose a solution for sealing a bipolar battery, more generally a lithium-based electrochemical generator, with respect to the electrolyte, more particularly a liquid electrolyte, which is robust during operation and over time, easy to use, preferably at relatively low temperature, which does not limit the electron conductivity of the lithium-based insertion materials and does not increase the internal electrical resistances in the bipolar collector(s).

DISCLOSURE OF THE INVENTION

For this purpose, the invention relates to a bipolar battery, of the Li-ion type, comprising:
  at least one first and second electrochemical cells stacked on top of one another and each comprising an anode, a cathode and an electrolyte;
  at least one bipolar current collector, one face of which is covered with the anode made of lithium-based insertion material of the first cell and the opposite face is covered with the cathode made of lithium-based insertion material of the second cell, the bipolar collector comprising at its periphery, on one of its faces, at least one first sealing device comprising a frame of electrically insulating and heat-sensitive material, and two frames of electrically insulating adhesive material arranged individually on either side of the heat-sensitive frame in a radial direction, perpendicular to the direction of stacking of the cells, the first device constituting a peripheral wall impervious to the electrolyte of the first or second cell, which surrounds the latter;
  at least one first current collector adjacent to the bipolar collector, one face of which is covered with the cathode of the first cell;
  at least one second current collector adjacent to the bipolar collector, one face of which is covered with the anode of the second cell;
  the first or the second adjacent collector also comprising, at its periphery, on its covered face, at least one second sealing device comprising a frame of an electrically insulating heat-sensitive material, and two frames of electrically insulating adhesive material arranged individually on either side of the heat-sensitive frame in a radial direction, perpendicular to the direction of stacking of the cells, the second device constituting a peripheral wall impervious to the electrolyte of the first or second cell, which surrounds the latter;
  each impervious peripheral wall being obtained by a heat-sealing technique of at least one first and at least one second sealing device on the face of a current collector that does not have a sealing device.

"Arranged individually on either side of the heat-sensitive frame in a radial direction, perpendicular to the direction of stacking of the cells" means that the frames are arranged adjacent behind one another at the periphery. The thickness of an electrochemical compartment defined by a cell is determined solely by the thickness of the first adhesive frame, i.e. that which is arranged nearest the periphery.

Thus, according to the invention, for each electrochemical compartment defined by a cell, a sealing device is employed, which is an electrically insulating object formed from an adhesive material, preferably double-faced, in the form of two frames, surrounding a frame of heat-sensitive material to allow complete sealing of said compartment by heat-sealing after heating.

According to the invention, the material of the core of the adhesive frame is different from the heat-sensitive material. The heat-sensitive material has a creep temperature lower than that of the material of the adhesive frame.

Advantageously, the heat-sensitive material has a creep temperature between 80° C. and 170° C., preferably of the order of 140±10° C.

The invention is able to provide:
  sealing of the various electrochemical compartments of a bipolar battery (accumulator) with respect to the electrolyte, i.e. preventing escapes to the exterior or between compartments, and with respect to the ambient air, i.e. preventing escapes to the interior of the compartments, through the use of a heat-sensitive material that is inert to the electrolyte;
  sealing reinforced by means of a sealing device with three frames: a first adhesive frame at the periphery of each compartment provides its electrical insulation and serves as a thickness block for defining the thickness of said compartment, within the first adhesive frame, a frame based on heat-sensitive material that provides perfect sealing against the electrolyte, and within the heat-sensitive frame a second adhesive frame that makes it possible, with the first adhesive frame, to partition off in the three dimensions the creep of the heat-sensitive material, i.e. which makes it possible to control perfectly the geometry of the seal defined;
  complete control of gluing giving holding of the assembly of the bipolar battery with perfect mechanical durability on the one hand within and outside of the heat-sensitive frame for each compartment and on the other hand of the stack of all the cells because each compartment is glued in its optimal position relative to the adjacent compartment(s) owing to the two double-faced adhesive frames;
  complete control of the constant thickness of each compartment giving optimal operation of the bipolar battery, because a sealing device according to the invention serves as a spacer.

Owing to the invention, any problems with the sealing solutions based on resin or polymer according to the prior art are overcome. In particular, the invention makes it possible to solve the problems of repeatability of sealing on the whole of a bipolar battery with heat-curing or heat-sealed seals according to the prior art. In fact, these problems of repeatability arise because of the method of filling under vacuum employed. This method means putting the compartments under pressure and under temperature one after another, thus generating creep stresses on the seal depending on its position in the stack of the bipolar battery. Accordingly, certain electrochemical compartments may no longer be impervious, with respect to the electrolyte but also with respect to the damp external environment.

In other words, the present invention proposes a solution to the problems of creep of heat-sealing seals according to the prior art, which makes it possible both to maintain constant thickness of each compartment of a bipolar battery and to safeguard the sealing while making it durable and facilitating holding of the assembly of the compartments during manufacture.

The electrically insulating materials constituting the frames according to the invention are very good electrical insulators for the bipolar battery application that is the aim of the invention and display high chemical resistance to the electrolyte and resistance to high operating temperatures.

Preferably, the material of the frame of the first or second sealing device is selected from the semicrystalline thermoplastic polyolefins: polyethylene (PE), polypropylene (PP), polymethylpentene (PMP), polybutene-1 (PB-1). More preferably, the material of the frame of the first or second sealing device is polyethylene (PE).

Advantageously, the material of the adhesive frames is a double-faced acrylic with a core of polypropylene (PP), or of poly(ethylene terephthalate) PET or of polyurethane.

It is to be understood that according to the invention, the material of the internal frame is different from the core material of the adhesive frames.

"Electrode of lithium-based insertion material" means an electrode comprising at least one lithium-based insertion material and at least one polymer binder. Optionally, the electrode may additionally comprise an electronic conductor, for example carbon fibers or carbon black.

"Lithium-based insertion material", in particular for the positive electrode, means a material selected from the lithiated oxides comprising manganese with a spinel structure, the lithiated oxides of lamellar structure and the mixtures thereof, the lithiated oxides with polyanionic frameworks of formula $LiM_y(XO_z)_n$ with M representing an element selected from Mn, Fe, Co, Ni, Cu, Mg, Zn, V, Ca, Sr, Ba, Ti, Al, Si, B and Mo, X representing an element selected from P, Si, Ge, S and As, y, z and n being positive integers.

"Lithium-based insertion material", in particular for the negative electrode, also means a material selected from: titanium oxide, whether or not lithiated, for example $Li_4Ti_5O_{12}$ or $TiO_2$. More particularly, the negative electrode material may be selected from the carbon-containing materials, the titanium oxides that are not lithiated and their derivatives and the lithiated titanium oxides such as $Li_4Ti_5O_{12}$ and their derivatives and a mixture thereof.

"Lithiated derivative" means compounds of formula $Li_{(4-x1)}M_{x1}Ti_5O_{12}$ and $Li_4Ti_{(5-y1)}N_{y1}O_{12}$, where x1 and y1 are respectively between 0 and 0.2 and M and N are respectively chemical elements selected from Na, K, Mg, Nb, Al, Ni, Co, Zr, Cr, Mn, Fe, Cu, Zn, Si and Mo.

Here, "non-lithiated derivative" means $Ti_{(5-y1)}N_{y1}O_{12}$, with y1 between 0 and 0.2 and N is a chemical element selected from Na, K, Mg, Nb, Al, Ni, Co, Zr, Cr, Mn, Fe, Cu, Zn, Si and Mo.

"Current collector adjacent to the bipolar current collector" means a collector that is closest to the bipolar current collector in the stack and which may also be a bipolar current collector other than a terminal current collector of the stack.

More preferably, the thickness of a sealing device is between 50 and 500 µm, preferably 150 µm plus or minus 50 µm.

Advantageously, the width of a sealing device is between 0.3 and 3 cm.

According to one embodiment, the bipolar battery comprises a stack of n electrochemical cells, with a number of n−2 bipolar current collectors, one of the adjacent collectors being a terminal current collector, the other one of the adjacent collectors being the other terminal current collector.

According to a variant embodiment, all the anodes are of $Li_4Ti_5O_{12}$ and the cathodes of $LiFePO_4$.

According to another of its aspects, the invention also relates to a method for making a bipolar battery comprising at least one first and second electrochemical cells stacked on top of one other and each comprising an anode, a cathode and an electrolyte, a/ producing a bipolar current collector with one face covered with the anode made of lithium-based insertion material of the first cell and the opposite face covered with the cathode made of lithium-based insertion material of the second cell;

b/ producing a first current collector, intended to be adjacent to the bipolar collector, one face of which is covered with the cathode of the first cell;

c/ producing a second current collector, intended to be adjacent to the bipolar collector, one face of which is covered with the anode of the second cell;

d/ depositing a frame of electrically insulating material at the periphery of each face of each collector covered with a cathode or with an anode;

e/ stacking the bipolar current collector with the first or second current collector, interposing a first separator between them, the stacking and interposing being carried out in such a way that the cathode of the first adjacent collector or the anode of the second current collector is opposite respectively to the anode or cathode of the bipolar collector, being separated from the first separator and with bringing first sealing device into contact with the heat-sensitive frame;

f/ heating the heat-sensitive frame of the first sealing device in contact at the periphery of the collectors;

g/ at the periphery, on its covered face, of the first or second current collector not heat-sealed to the bipolar current collector, making at least one second sealing device comprising a frame of an electrically insulating heat-sensitive material, and two adhesive frames arranged individually on either side of the heat-sensitive frame in a radial direction, perpendicular to the direction of stacking of the cells;

h/ stacking the heat-sealed bipolar current collector with the first or second current collector with the first or second current collector that is not heat-sealed, interposing a second separator between them, the stacking and interposing being carried out in such a way that the cathode of the first adjacent collector or the anode of the second current collector is opposite respectively to the anode or cathode of the bipolar collector, being separated from the second separator, and with bringing second sealing device into contact with the heat-sensitive frame;

i/ heating the heat-sensitive frame of the second sealing device in contact at the periphery of the collectors.

Preferably, an initial thickness of heat-sensitive material is selected greater than that of the adhesive frames. Thus, when the periphery of the compartments is heat-sealed in steps f/ and i/, the heat-sensitive material has a tendency to flow into the space that is left free for it between the two adhesive frames, until it reaches their thickness.

Here and in the context of the invention, "separator" means an ionic conductor electrical insulator formed by at least one polymer material such as polyvinylidene fluoride (PVDF), polyvinyl acetate (PVA), polymethyl methacrylate (PMMA), polyoxyethylene (POE), polyethylene terephthalate (PET), a polymer selected from the polyolefins such as polypropylene, polyethylene, cellulose.

The electrolyte according to the invention may be a liquid formed from a mixture of carbonate and at least one lithium salt. "Lithium salt" preferably means a salt selected from $LiPF_6$, $LiClO_4$, $LiBF_4$ and $LiAsF_6$.

Alternatively, the electrolyte may comprise one or more ionic liquids, based on lithium ions, namely a salt consisting of lithium cations complexed with inorganic or organic anions, which has the property of being in the liquid state at room temperature. An ionic liquid may be hydrophilic or hydrophobic, depending on the nature of the anion. As examples of ionic liquids, we may mention ionic liquids based on hydrophobic anions such as trifluoromethanesulfonate $(CF_3SO_3)$, bis(trifluoromethanesulfonate) imide $[(CF_3SO_2)_2N]$ and tris(trifluoromethanesulfonate) methide $[(CF_3SO_2)_3C]$.

The heating according to steps f/ and i/ is preferably carried out using U-shaped heating jaws around the peripheral parts of the collectors, and preferably at a temperature below 170° C., more preferably below 150° C.

It goes without saying that the adhesive materials have a melting point above the temperature of heating according to steps f/ and i/ allowing heat-sealing of the frames of heat-sensitive material. In other words, the adhesive materials are heat-resistant.

In an advantageous embodiment, the adhesives consist of a double-faced acrylic with a core of PP or PET and the heat-sensitive material of the central frame is of PE.

DESCRIPTION OF THE DRAWINGS

Other advantages and features will become clearer on reading the detailed description, given for purposes of illustration, referring to the following figures, where.

For clarity, the same references denoting the same bipolar battery elements according to the prior art and according to the invention are used for all the figures (FIGS. 1 to 8).

DETAILED DESCRIPTION OF THE INVENTION

Figure 1:
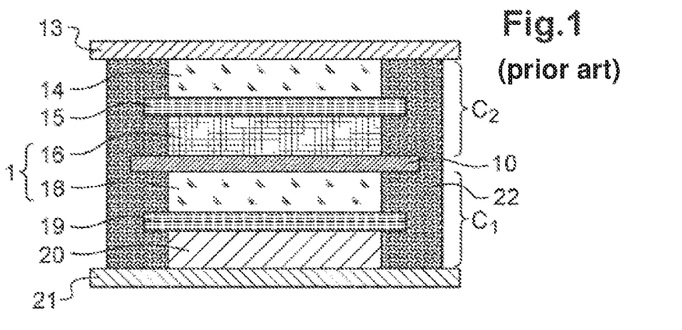
FIG. 1 is a schematic view in longitudinal section of a lithium-based bipolar battery according to the prior art.
Figure 2A:
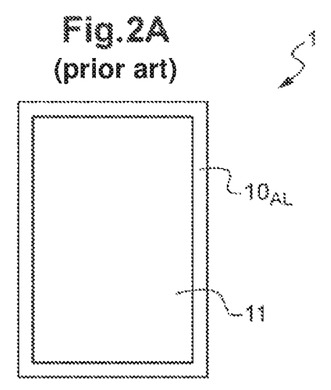
FIGS. 2A and 2B are respectively front and sectional views of a bipolar current collector used in a lithium-based bipolar battery according to the prior art.
Figure 2B:
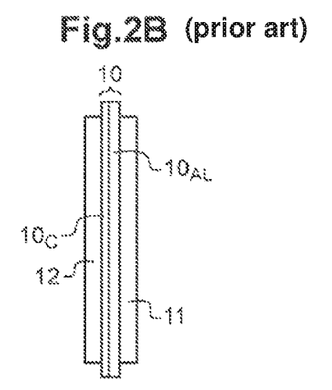

FIG. 1 shows a bipolar Li-ion battery according to the prior art, as illustrated in patent application WO 03/047021. This battery comprises, in the upper portion, a conductive aluminum substrate 13 (positive terminal current collector) and an active layer 14 based on lithium-based positive insertion material, such as $Li_{1.04}Mn_{1.96}O_4$ and, in the lower portion, a conductive aluminum substrate 21 (negative terminal current collector) and an active layer 20 based on lithium-based positive insertion material, such as of $Li_4Ti_5O_{12}$.

Within this battery, a bipolar electrode 1, also called bipolar current collector, comprises an anode layer 16 and a cathode layer 18 on either side of a conductive aluminum substrate 10 in the form of a plate. The lower electrodes 20 and upper electrodes 14 are separated from the bipolar electrode 1 by two separators 15, 19 in which an electrolyte is present in the form of liquid or gel. Sealing of the battery against the electrolytes between the two resultant adjacent electrochemical cells 14, 15, 16 and 18, 19, 20 is provided by a seal 22 which is made by depositing resin or glue on the periphery of all the electrodes and the plate 10.

Figure 3A:
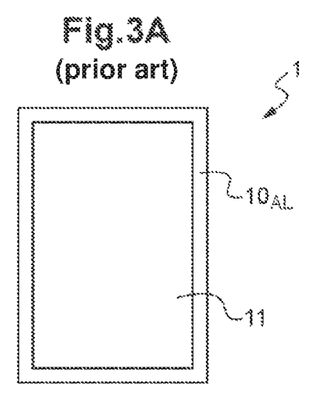
FIGS. 3A and 3B are respectively front and sectional views of another bipolar current collector used in a lithium-based bipolar battery according to the prior art.
Figure 3B:
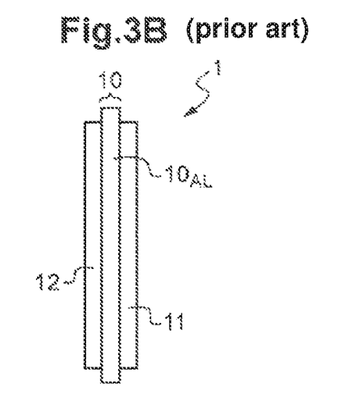

Depending on the lithium-ion insertion materials used for making the electrodes, a bipolar current collector 10 according to the prior art:
  either consists of two superposed plates, one of which, typically of aluminum 10A1, is covered with a cathode 11 and the other, typically of copper 10C, is covered with an anode 12 (FIGS. 2A and 2B),
  or consists of a single plate typically of aluminum 10A1 covered on one face with a cathode 11 and on the other face with an anode 12 (FIGS. 3A and 3B). The main difficulty encountered in designing a bipolar battery according to the prior art is to make compartments that are perfectly impervious to the electrolyte, generally in liquid form, relative to one another, such as between the two cells C1 and C2, i.e. between compartments referenced 14, 15, 16 and 18, 19, 20 in FIG. 1.

The making of the seals 22 or enlargement of the plates 10 of the bipolar electrode according to the prior art to achieve this are not completely satisfactory.

Figure 4:
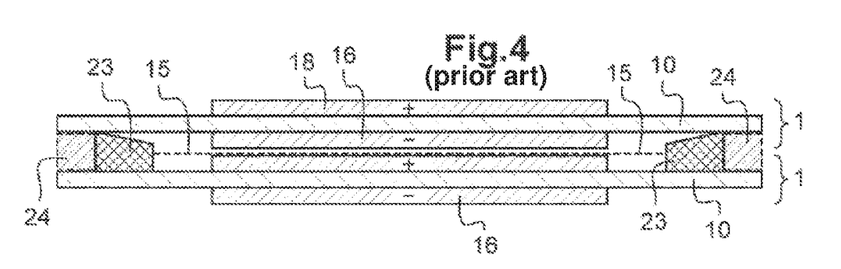
FIG. 4 is a longitudinal sectional view showing the creep of a heat-sealing seal employed in a lithium-based bipolar battery according to the prior art.

A solution for sealing using heat-sealing seals 23 in a bipolar battery already employed by the inventors is illustrated in FIG. 4: a seal 23 of heat-sealing material in the form of a frame is provided at the periphery of a bipolar collector 10 and a single frame of adhesive material 24 is provided on the exterior of the frame 23. As shown schematically in FIG. 4, the material of the frame 23 has flowed toward the interior of the compartment so that the effective gluing zone is of a limited area, shaped somewhat like a bird's beak. This reduced, uncontrolled gluing is likely to cause a risk of escape of the electrolyte. Moreover, owing to this creep, it is not possible to control the thickness of an electrochemical compartment.

Thus, the inventors propose a new solution for sealing a bipolar Li-ion battery with respect to the electrolyte, more particularly a liquid electrolyte, which is robust during operation and over time and is easy to implement.

Surprisingly, the inventors decided to employ a simple solution: add an additional frame 24 of adhesive material, inside frame 23 of heat-sensitive material in a radial direction, perpendicular to the direction of stacking of the cells. Thus, instead of completely abandoning the mixed solution of a frame of heat-sensitive material and a frame of adhesive material, they carefully tried to contain the potential creep of the heat-sensitive material, i.e. to control its dimensions during heating for carrying out heat-sealing thereof.

Figure 5:
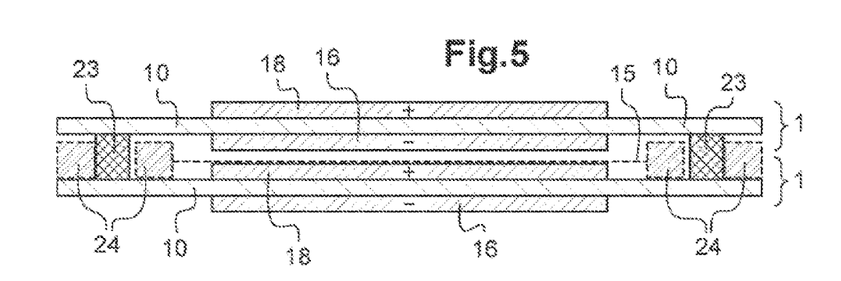
FIG. 5 is a longitudinal sectional view showing a sealing device used in a lithium-based bipolar battery according to the invention.
Figure 6:
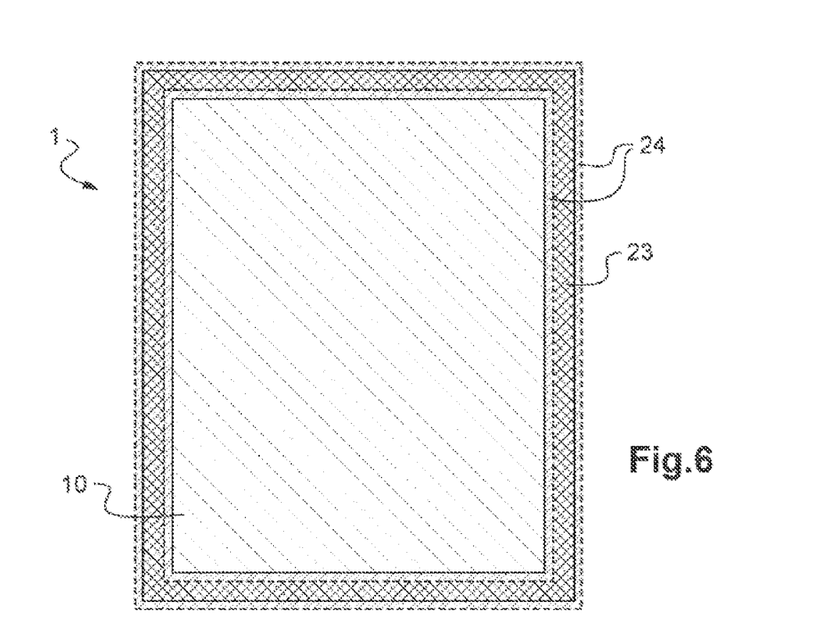
FIG. 6 is a top view of a bipolar current collector with a sealing device according to the invention.

Thus, as illustrated in FIGS. 5 and 6, a sealing device according to the invention between two bipolar current collectors 1 or between a bipolar current collector and a terminal current collector 13, 21 of a Li-ion battery, consists of a frame 23 of electrically insulating heat-sensitive material, and two frames 24 of adhesive material arranged individually on either side of frame 23.

The steps for production of a bipolar battery with the sealing devices according to the invention are described below with reference to FIGS. 7A to 7J. The battery produced comprises three cells C1, C2, C3 stacked on top of one other and each comprising an anode, a cathode and an electrolyte. It is to be noted that all the substrates 10, 13, 21 are of aluminum. All the anodes are of $Li_4Ti_5O_{12}$ and all the cathodes are of $LiFePO_4$. The separators are all of the same material, such as polyvinylidene fluoride (PVDF). The electrolyte used is a mixture of carbonate and a lithium salt $LiPF_6$.

It is to be noted here that as an advantageous example, the material of each frame 23 is polyethylene (PE) and that each adhesive frame 24 is made from from adhesive tape marketed under the name 3M® 467MP.

It should also be noted that, as illustrated schematically, a frame 23 has an initial thickness, before heat-sealing, greater than that of the two frames 24 of adhesive material bordering it. Thus, when the periphery of the electrochemical compartments is heat-sealed, the material of the frame 23 will tend to flow into the space that is left free for it between the two adhesive frames 24 until it reaches the thickness of the latter.

Figure 7A:
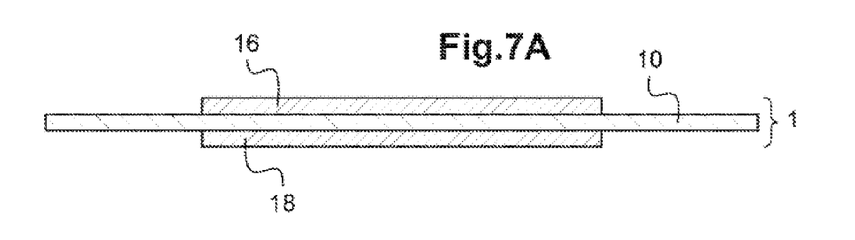
FIGS. 7A to 7J are longitudinal sectional views showing the different steps in the production of a lithium-based bipolar battery with three electrochemical cells (C1, C2, C3) according to the invention.

Step 1: a first bipolar current collector 1 is produced with a face covered with the anode 16 of a first cell C1 and the opposite face covered with the cathode 18 of the second cell C2 (FIG. 7A).

A second bipolar current collector 1 is also produced with a face covered with the cathode 18 of a third cell C3 and the opposite face covered with the anode 16 of the second cell C2 (FIG. 7A).

Figure 7B:
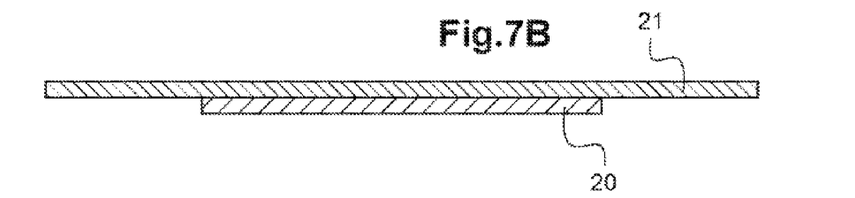

Step 2: a terminal current collector 21 is produced with a face covered with the anode 20 of a third cell C3 (FIG. 7B).

Figure 7C:
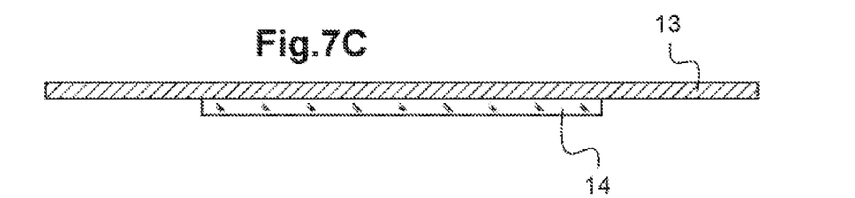
Figure 7D:
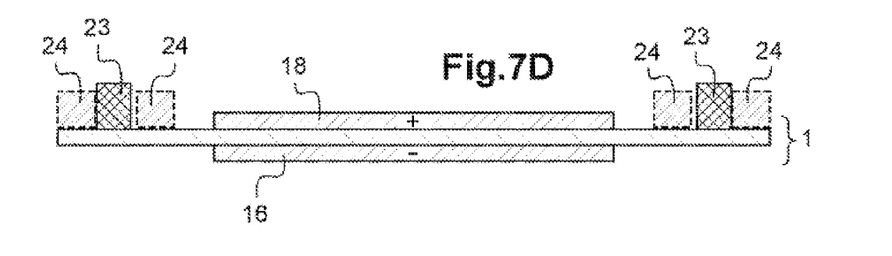
Figure 7E:
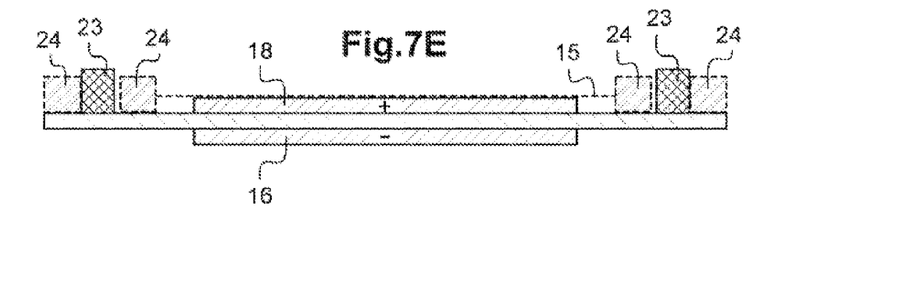

Step 3: a terminal current collector 13 is produced with a face covered with the cathode 14 of the first cell C1 (FIG. 7C).

Step 4: at the periphery of the face covered with the cathode 18 of the first bipolar current collector 1, a first sealing device is produced comprising a frame 23 of an electrically insulating heat-sensitive material, and two frames 24 of adhesive arranged individually on either side of the heat-sensitive frame 23 in a radial direction, perpendicular to the direction of stacking of the cells (FIG. 7 D).

Step 5: a first separator 15 is interposed, placing it on the cathode 18 of the first bipolar current collector (FIG. 7 E).

Figure 7F:
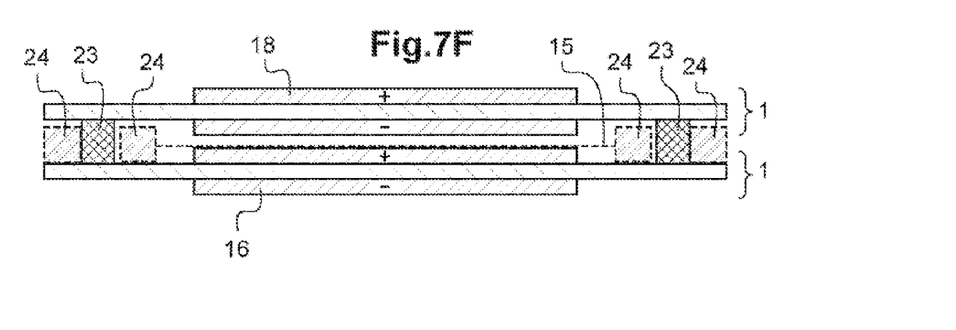

Step 6: the second bipolar current collector 1 is stacked on the first bipolar current collector 1, bringing into contact the first frame 23 around the anode 16 of the second bipolar collector (FIG. 7F).

Figure 7G:
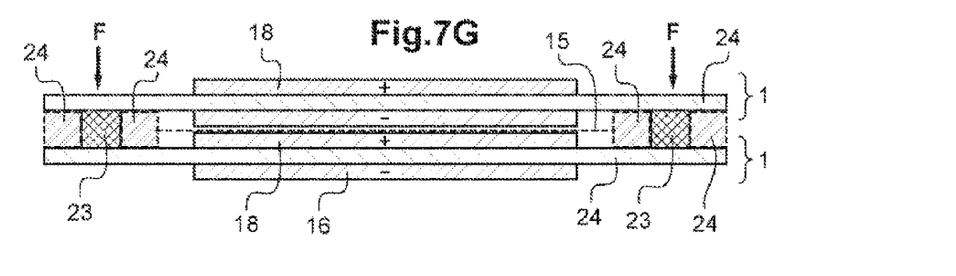

Step 7: heating is carried out using U-shaped heating jaws, not shown, surrounding the stack of the two bipolar current collectors 1: thus, a cycle of pressure according to a force F and of temperature is applied to perform heat-sealing between the two collectors 1 with the aid of frame 23 and to precisely define the thickness of the second cell C2 (compartment) (FIG. 7G).

Step 8: at the periphery of the face covered with the cathode 18 of the second bipolar current collector 1, a second sealing device is produced comprising a frame 23 of an electrically insulating heat-sensitive material, and two frames 24 of adhesive arranged individually on either side of the heat-sensitive frame 23 in a radial direction, perpendicular to the direction of stacking of the cells.

Figure 7H:
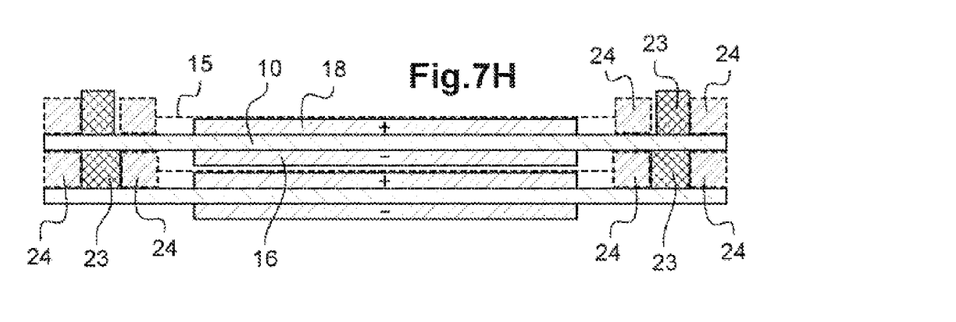

Step 9: a second separator 15 is interposed, placing it on the cathode 18 of the second bipolar current collector (FIG. 7H).

Step 10: the terminal current collector 21 with its face covered with the anode 20 is stacked on the second bipolar current collector 1, bringing the second frame 23 in contact at the periphery of the anode 20.

Figure 7I:
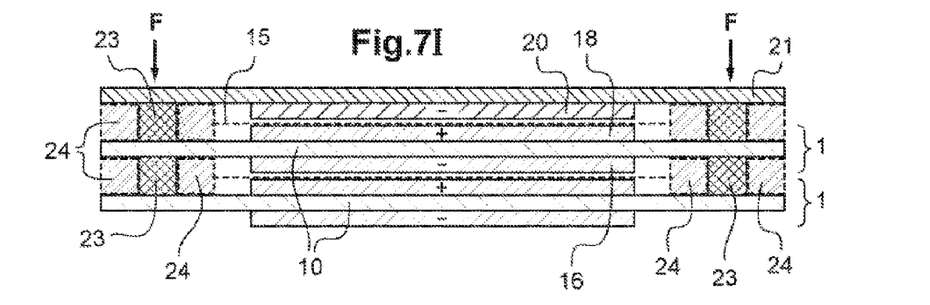

Step 11: heating is carried out using U-shaped heating jaws, not shown, surrounding the stack of the two bipolar current collectors 1 and of the terminal collector 21: thus, a cycle of pressure according to a force F and of temperature is applied to perform heat-sealing using the second frame 23 and to precisely define the thickness of the third cell C3 (compartment) (FIG. 7I).

Step 12: at the periphery of the face covered with the cathode 14 of the second terminal current collector 13, a third sealing device is produced comprising a frame 23 of an electrically insulating heat-sensitive material, and two frames 24 of adhesive arranged individually on either side of the heat-sensitive frame 23 in a radial direction, perpendicular to the direction of stacking of the cells.

Step 13: a third separator 15 is interposed, placing it on the cathode 14 of the second terminal current collector 13.

Step 14: the assembly already constructed from the bipolar collectors 1 and the terminal current collector 21, heat-sealed together, is stacked on the second terminal current collector 13 with its face covered with the cathode 14, bringing the third frame 23 into contact at the periphery of the anode 16 of the first bipolar collector.

Figure 7J:
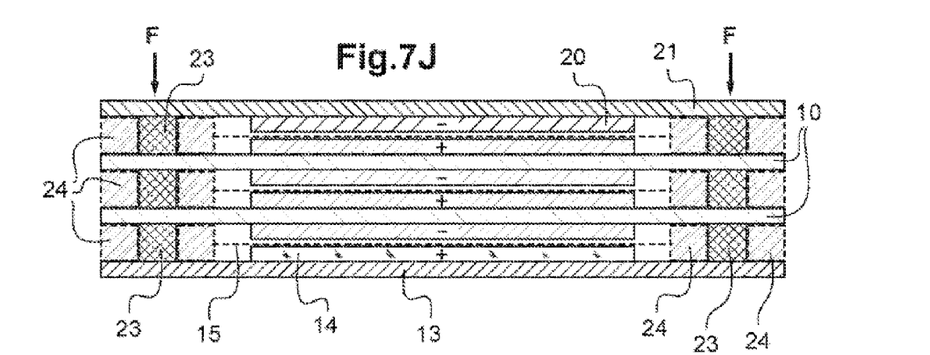

Step 15: heating is carried out using U-shaped heating jaws, not shown, surrounding the stack of the two bipolar current collectors 1, the first terminal collector 21 and the second terminal collector 13, thus a cycle of pressure according to a force F and of temperature is applied to perform heat-sealing using third frame 23 and to precisely define the thickness of the first cell C1 (compartment) (FIG. 7J).

The sealing thus obtained by all the frames 23 and the adhesive frames 24 is thus perfect with respect to the electrolyte.

Figure 8:
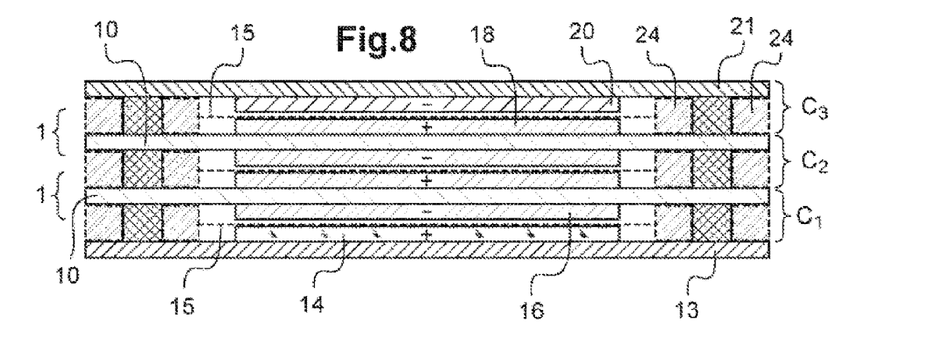
FIG. 8 is a longitudinal sectional view of a lithium-based bipolar battery with three electrochemical cells (C1, C2, C3) according to the invention.

A bipolar battery has thus been produced with three cells C1, C2, C3, with perfect sealing provided at the level of their periphery, and whose thickness is constant for each cell C1, C2, C3.

Regarding the electrolytes, an electrolyte may be used in the form of polymer or in liquid form impregnated in a separator. For activation of the latter, we may proceed via impregnation of each separator prior to their integration during assembly. Alternatively, assembly may be performed with stacking of the whole battery, carrying out the heat-sealing operations according to the invention and then making, via a tube arranged inside the frames, an inlet for the liquid electrolyte for subsequent filling.

The invention is not limited to the examples that have just been described; notably, features of the examples illustrated may be combined within variants that have not been illustrated.

It goes without saying that although sealing according to the invention with the device with a heat-sensitive frame surrounded by two adhesive frames has been described in relation to a bipolar battery with two cells stacked, it may be carried out in the same way for a battery with a number n of stacked cells by repeating the above steps 1 to 7 with a number equal to n−2 of bipolar collectors and two terminal current collectors 13, 21.

The invention claimed is:

1. A bipolar Li-ion battery comprising:
   at least one first and second electrochemical cells stacked on top of one other in a direction of stacking and each comprising an anode, a cathode and an electrolyte;
   at least one bipolar current collector having two faces, one face of which is covered with the anode of lithium-based insertion material of the first electrochemical cell and the opposite face is covered with the cathode of lithium-based insertion material of the second electrochemical cell, the bipolar current collector comprising at its periphery, on one of its faces, at least one first sealing device comprising a first heat-sensitive frame of an electrically insulating and heat-sensitive material, and two first adhesive frames of adhesive arranged individually on either side of the first heat-sensitive frame in a radial direction, perpendicular to the direction of stacking of the electrochemical cells, the first device constituting a first peripheral wall impervious to the electrolyte of the first or second electrochemical cell, which surrounds the latter;
   at least one first current collector adjacent to the bipolar current collector, one face of which is covered with the cathode of the first electrochemical cell;
   at least one second current collector adjacent to the bipolar current collector, one face of which is covered with the anode of the second electrochemical cell;
   the first or second current collector adjacent to the bipolar current collector also comprising, at its periphery, on its covered face, at least one second sealing device comprising a second heat-sensitive frame of an electrically insulating and heat-sensitive material, and two second adhesive frames of adhesive arranged individually on either side of the second heat-sensitive frame in the radial direction perpendicular to the direction of stacking of the electrochemical cells, the second device constituting a second peripheral wall impervious to the electrolyte of the first or second electrochemical cell, which surrounds the latter;
   each impervious peripheral wall being obtained by a heat-sealing technique of at least one first and at least one second sealing device on the face of the first or second current collector adjacent to the bipolar current collector that does not have the first or the second sealing device.

2. The bipolar battery as claimed in claim 1, the heat-sensitive frame of the first or second sealing device being made of semicrystalline thermoplastic polyolefins selected among: polyethylene, polypropylene, polymethylpentene, polybutylene.

3. The bipolar battery as claimed in claim 2, the frame of the first or second sealing device being made of polyethylene.

4. The bipolar battery as claimed in claim 1, the first and second adhesive frames being made of a double-faced acrylic with a core of polypropylene, or of polyethylene terephthalate or of polyurethane.

5. The bipolar battery as claimed in claim 1, the thickness of the first and/or the second sealing device being between 50 and 500 μm.

6. The bipolar battery as claimed in claim 1, the width of the first and/or the second sealing device being between 0.3 and 3 cm.

7. The bipolar battery as claimed in claim 1, comprising a stack of a number n of electrochemical cells, a number of n−2 of said electrochemical cells being bipolar current collectors and two electrochemical cells being a first and a second adjacent current collectors, one of said adjacent current collectors being a terminal current collector, the other one of said adjacent current collectors being the other terminal current collector.

8. The bipolar battery as claimed in claim 1, the anodes being of $Li_4Ti_5O_{12}$ and the cathodes of $LiFePO_4$.

* * * * *